Figure 1:
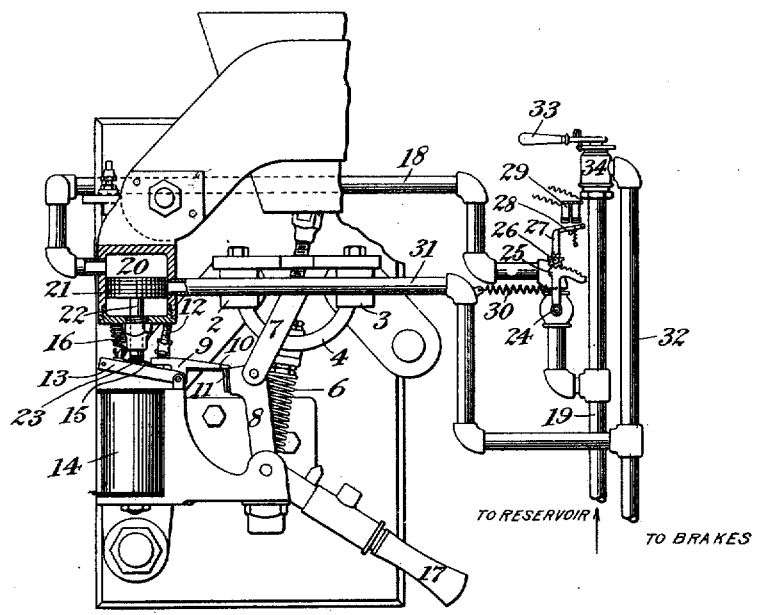

F. E. KINSMAN.
MEANS FOR CONTROLLING THE MOVEMENTS OF A VEHICLE.
APPLICATION FILED MAY 10, 1905.

911,595.

Patented Feb. 9, 1909.
2 SHEETS—SHEET 1.

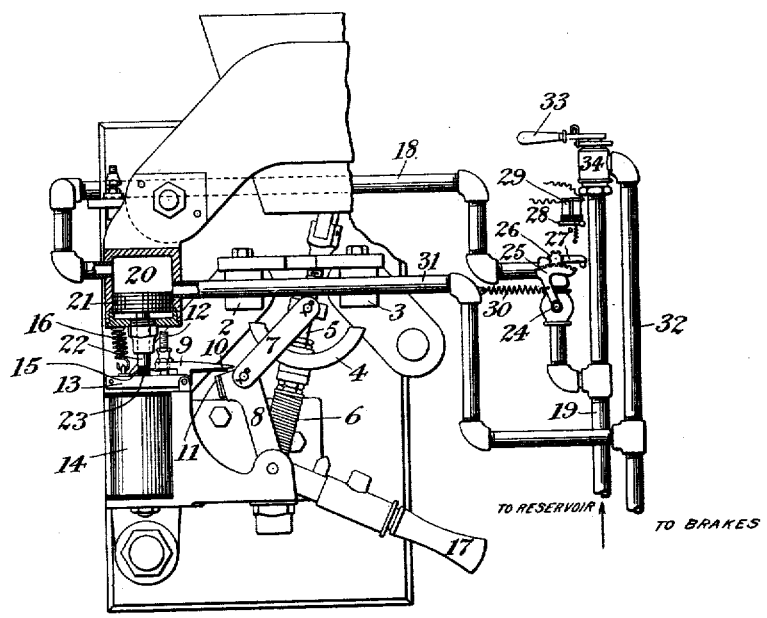

UNITED STATES PATENT OFFICE.

FRANK E. KINSMAN, OF PLAINFIELD, NEW JERSEY, ASSIGNOR TO THE KINSMAN BLOCK SYSTEM COMPANY, A CORPORATION OF NEW YORK.

MEANS FOR CONTROLLING THE MOVEMENTS OF A VEHICLE.

No. 911,595.

Specification of Letters Patent.

Patented Feb. 9, 1909.

Application filed May 10, 1905. Serial No. 259,717.

*To all whom it may concern:*

Be it known that I, FRANK E. KINSMAN, a citizen of the United States, and a resident of Plainfield, in the county of Union and State of New Jersey, have invented certain new and useful Improvements in Means for Controlling the Movements of a Vehicle, of which the following is a specification.

This invention relates to means for controlling the movements of a vehicle on a line of way or railway, and especially to a system for automatically controlling and stopping the movement of an electrically-operated vehicle or train when there is a danger condition ahead of the same, the present invention being in the nature of an improvement upon automatic train-stopping systems disclosed in prior patents granted to me, and being adapted particularly for use on vehicles having electrically-operated power mechanism and fluid-operated brakes.

One of the principal objects of this invention is to provide improved means for breaking the power circuit of an electrically-operated vehicle or train. In order to accomplish this result any suitable source of power may be used which is available for use on the vehicle at all points on the line of way, this source of power being utilized to operate an automatic power-controller independent of the manual controller by means of which the application of the motive power on the vehicle is ordinarily governed. As in my prior patents the operation of this automatic power-controller is dependent upon suitable controlling means governed by a danger condition on the line of way.

It is customary to operate the brakes on many types of electric cars by power derived from a fluid-pressure system, and I prefer to make use of the usual air-brake system employed on such electric cars as the source from which power is taken for operating the automatic power-controller on said car. On electric cars the automatic power-controller will be an automatic circuit-breaker, and in the system shown in this case such an automatic circuit-breaker is operated automatically by a portion of the air pressure in the air-brake system, whenever the application of such pressure for the purpose of operating the circuit-breaker is permitted by the controlling means governed by a danger condition on the line.

On electric cars it is customary to control the power circuit on the car by means of an automatic circuit-breaker which will open the circuit whenever an excessive current is supplied to the circuit on such car. I prefer to make use of a circuit-breaker of this kind as the means for breaking the power circuit on a car or other vehicle when there is a danger condition ahead. The opening of the power circuit on the vehicle by this circuit-breaker because of a danger condition ahead of the vehicle need not, however, interfere with the operation of such a circuit-breaker in the well-known manner by an excessive current in the power circuit on the vehicle, and in the construction illustrated herein the same automatic circuit-breaker is controlled both by excessive current in the power circuit on the vehicle and by a danger condition on the line of way ahead of the vehicle, so that a single automatic circuit-breaker will control the breaking of the power circuit, and therefore the movement of the vehicle, for either of these danger conditions, the one in the power circuit and the other on the track ahead of the car or train.

In the system illustrated in the present case the manual and automatic means for controlling the power for operating the vehicle are entirely independent of each other, there being no mechanical connection between them, and the automatic power-controller or circuit-breaker governing a different break in the power circuit from that governed by the manual controller. The automatic power-controller or circuit-breaker is positively controlled, as before stated, by a source of power available at all times for operating it, and this source of power is brought into action whenever a danger condition on the line of way operates the controlling device therefor; and when power from this source is applied to operate the circuit-breaker or other automatic power controller, the automatic action is completed by the power so applied regardless of whether the automatic controlling device is still in position or condition to be governed by a danger condition on the line of way. In this respect my present invention differs from that disclosed in my prior Patent No. 505,833, granted October 3, 1893, in which the source of power for operating the automatic circuit-breaker is available only so long as the controlling device is in engagement with a contact on the line of way.

Other features of my invention not hereinbefore referred to will be hereinafter described and claimed and are illustrated in the accompanying drawings, in which—

Figure 1 is a side elevation, with parts broken away, of my improved automatic power and brake controlling system, as applied to an electrically-operated vehicle, the automatic controlling devices being in their normal positions. Fig. 2 is a similar view of said automatic controlling system and illustrates these devices in their working positions, with the power circuit open and the pressure in the brake-pipe of the brake system released.

Similar characters designate like parts in all the figures of the drawings.

The various controlling parts which are embodied in my present invention are illustrated as applied to an electrically-operated vehicle, but as the various devices included in the power circuit for operating such vehicle are old and well known, these, with the exception of the automatic circuit-breaker, are not shown herein. As to many of the features thereof the automatic circuit-breaker illustrated herein is also of well-known construction. The circuit-breaker illustrated is of the toggle-lever type, and embodies a pair of contacts 2 and 3 which control one break in the power circuit on the vehicle, these contacts being normally spanned in this case by a contact-segment 4, which is adjustable and is mounted to move longitudinally of a guide-rod 5, the segment 4 being connected to a strong spring 6, by means of which the power circuit is quickly interrupted when the spring is released by the toggle. The two members of the toggle may be constructed as shown at 7 and 8, and will normally be held at such an angle as to permit the toggle to be quickly struck when released from the holding device. The holding device shown is in the form of a detent 9 pivoted at a suitable fixed point and having a substantially vertical holding face 10 which engages a coacting face 11 of the toggle member 8. The movement of this detent 9 in one direction may be determined by the adjustable stop 12, and in the other direction by the armature 13 of an electro-magnet 14 which constitutes the means for automatically releasing the detent 9 when there is an excessive current in the power circuit. The pivot of this armature in the present construction is the same as that of the detent 9, and said armature carries a spring 15 which serves to hold the detent in the proper position with respect to the armature 13. This armature will be normally retracted from the poles of the magnet, a spring being shown at 16 for this purpose.

The parts just described are those which are ordinarily employed to open a power circuit on an electrically-operated vehicle when there is a danger condition present as a result of the presence of an excessive current in the power circuit on the vehicle. Whenever such an excessive current is present the magnet 14 will be energized, the armature 13 attracted and the holding-face 10 of the detent 9 released from the holding-face 11 of the toggle member 8, whereupon the spring 6 will quickly withdraw the segment 4 from the contacts 2 and 3 and thereby open the power circuit to prevent injury to the mechanism included therein. This automatic circuit-breaker has the usual handle 17 for manually setting it in its normal position.

Under ordinary conditions of travel the power circuit on the vehicle will be opened and closed by a manual power-controller (not shown) of a type corresponding to the nature of the power used. In the system shown an ordinary manual electrical controller will of course be used. In order, however, that the power for operating the vehicle may be automatically shut off when there is a danger condition on the line of way ahead of such vehicle, I make use, as in systems shown in my prior patents, of automatic power-controlling means. Here one of the principal elements of the automatic power-controlling means is an automatic circuit-breaker, preferably the automatic circuit-breaker just described. When controlled by a danger condition on the line of way the opening of the power circuit by this automatic circuit-breaker may also be effected by the release of the detent 9 from the toggle member 8. Any suitable means for accomplishing this result may be employed, but it is desirable that sufficient power be available for positively releasing the detent 9 regardless of the amount of power required to operate the controlling device which is directly influenced as a result of the presence of a danger condition on the line of way, and regardless also of the length of time during which such controlling device is so influenced. I deem it desirable to make use of a source of power which is available for operating such automatic power-controller or circuit-breaker at all points on the line of way, the fluid-pressure or air-brake system of an electric car being here illustrated as the source from which such power is derived. When the air-brake system is so employed it is obvious that it is desirable to effect both the automatic shutting off of the power and the automatic application of the brakes by properly controlling the pressure in the brake system. This control may be effected by means similar to the automatic controlling devices shown for this purpose in my prior patents, a controlling-valve governing both the power and the brakes being preferably placed in the proper pipe of the brake system for the purpose of automatically releasing the detent 9 from the toggle member 8, and also varying the pressure in the brake-pipe in such a manner as to enable the brakes to be automatically applied. In this case the automatic controlling valve just mentioned is in a pipe 18 connected with the pipe 19 leading from the air-reservoir or source of power (not shown). This pipe 18 leads to a cylinder 20 containing a piston 21, the piston-rod 22 of which is preferably guided in an opening or bushing at one end only of the cylinder 20. The extreme outer end of the piston-rod 22 is shown as covered with insulating material 23, in order that it may coöperate properly with the armature 13 of the electromagnet 14 without interfering with the magnet and its armature when the same are energized. The stem of the automatic controlling-valve is shown at 24, and the valve itself is controlled by a segment 25 secured to the valve and meshing with a pinion 26 carrying a stop-arm 27 normally held by the armature 28 of a controlling electromagnet 29 which is governed by a danger condition on the line of way. This electromagnet may be connected in a short-circuit on the vehicle in substantially the manner described in my prior Patent No. 735,527, granted August 4, 1903. The parts just described are so constructed and organized as to permit the automatic controlling-valve 24 to be operated to open communication between the pipe 19 and the pipe 18 when the stop-arm 27 is released by the armature 28. Any suitable means may be employed for effecting this movement of the valve, a spring 30 being shown herein as connected to the segment 25 and a suitable fixed point for this purpose. When said valve, its segment and connecting parts are shifted to the positions shown in Fig. 2 the pressure in the air-reservoir will be let off directly through the pipe 18 into the upper part of the cylinder 20, and the piston 21 will be forced down and will force with it the armature 13 of the magnet 14. This movement of the piston 21 will continue until the latch 9 is released from the toggle-arm 8, whereupon the spring 6 will strike the toggle in the manner before described and automatically open the power circuit by withdrawing the segment 4 from the contacts 2 and 3. Before the piston 21 reaches the limit of its downward movement it will uncover an outlet into a pipe 31 which is connected with the brake-pipe 32, and the pressure in the cylinder 20 will be permitted to escape through the pipe 31 into said brake-pipe. At the same time that the air pressure is permitted to enter the cylinder 20 through the pipe 18 on the opening of the valve 24 in the manner before described, the pressure in the brake-pipe 32 will be relieved by this movement of the valve 24, and the brakes on the car or train will be automatically applied. The manual application of such brakes, under ordinary circumstances, that is when there is no emergency condition present necessitating the automatic application just described, may be effected by a manual controller or brake-handle 33 connected to a valve in a casing 34, the pipes 19 and 32 being normally in communication with each other through this valve.

The automatic controlling devices just described for shutting off the power and applying the brakes may be governed by any suitable means controlled by a danger condition of any kind on the line of way. The means employed may be operated manually or automatically in any suitable way shown in my prior patents or applications. When there is a danger condition present on the line of way the controlling magnet 29 will be energized and the train automatically stopped by the devices hereinbefore described which operate to shut off the power and apply the brakes.

After an automatic opening of the circuit-breaker and an automatic application of the brakes take place the automatic controlling devices on the car or train may be reset, the automatic circuit-breaker in the well-known manner, and the valve 24 and its coacting parts in any suitable manner, as for example, by devices similar to those shown in my Patent No. 735,527.

What I claim is:

1. Means for controlling the movement of an electrically-operated vehicle on a line of way, said means embodying an automatic quick-acting circuit-breaker, a source of power available for use on the vehicle at all points on the line of way for governing the operation of said automatic circuit-breaker, and controlling means governed by a danger condition on the line of way and governing the application of power to said automatic circuit-breaker.

2. Means for controlling the movement of an electrically-operated vehicle on a line of way, said means embodying an automatic quick-acting circuit-breaker, a source of power available for use on the vehicle at all points on the line of way for governing the operation of said automatic circuit-breaker, and automatic controlling means governed by a danger condition on the line of way and governing the application of power to said automatic circuit-breaker.

3. Means for controlling the movement of an electrically-operated vehicle on a line of way, said means embodying an automatic quick-acting circuit-breaker, a source of power on said vehicle, means actuated by power from said source and governing the operation of said circuit-breaker, and controlling means governed by a danger condition on the line of way for setting said power-actuated means in action.

4. Means for controlling the movement of an electrically-operated vehicle on a line of way, said means embodying an automatic quick-acting circuit-breaker, a source of fluid pressure on such vehicle, fluid-actuated means for operating said circuit-breaker, and controlling means governed by a danger condition on the line of way and governing said fluid-actuated means.

5. Means for controlling the movement of an electrically-operated vehicle on a line of way, said means embodying an automatic quick-acting circuit-breaker, a source of fluid pressure on said vehicle, fluid-actuated means for operating said circuit-breaker, a valve governing the operation of said fluid-actuated means, and valve-controlling means governed by a danger condition on the line of way.

6. Means for controlling the movement of an electrically-operated vehicle on a line of way, said means embodying an automatic quick-acting circuit-breaker, a fluid-pressure brake system, means actuated by the fluid in said brake system for operating said circuit-breaker, and controlling means governed by a danger condition on the line of way and governing such fluid-actuated means.

7. Means for controlling the movement of a vehicle on a line of way, said means embodying a fluid-pressure system on the vehicle and including a cylinder and its piston, an automatic quick-acting power-controller independent of the manual power-controller for the vehicle and governed by said piston and governing the power mechanism which operates the vehicle, and controlling means governed by a danger condition on the line of way and governing the application of fluid pressure to said piston.

8. Means for controlling the movement of an electrically-operated vehicle on a line of way, said means embodying an automatic circuit-breaker, and means responsive to danger conditions in the power circuit and on the line of way for automatically operating said circuit-breaker.

9. Means for controlling the movement of an electrically-operated vehicle on a line of way, said means embodying an automatic circuit-breaker, means responsive to a danger condition in the power circuit for automatically operating said circuit-breaker, and means responsive to a danger condition on the line of way for automatically operating said circuit-breaker.

10. The combination with a line of way and with an electrically-operated vehicle movable therealong, of means responsive to danger conditions in the power circuit and on the line of way for automatically controlling said power circuit.

11. The combination with a line of way and with an electrically-operated vehicle movable therealong, of means responsive to danger conditions in the power circuit and on the line of way for automatically breaking said power circuit.

12. Means for controlling the movement of an electrically-operated vehicle on a line of way, said means embodying an automatic circuit-breaker, means responsive to a danger condition in the power circuit for automatically operating said circuit-breaker, a source of power available for use on the vehicle at all points on the line of way and also governing the operation of said automatic circuit-breaker, and controlling means governed by a danger condition on the line of way and governing the operation of said automatic circuit-breaker by power from said source.

13. Means for controlling the movement of an electrically-operated vehicle on a line of way, said means embodying an automatic circuit-breaker, means responsive to a danger condition in the power circuit for automatically operating said circuit-breaker, a source of power on the vehicle and also governing the operation of said automatic circuit-breaker, and controlling means governed by a danger condition on the line of way and governing the operation of said automatic circuit-breaker by power from said source.

14. Means for controlling the movement of an electrically-operated vehicle on a line of way, said means embodying an automatic circuit-breaker, means responsive to a danger condition in the power circuit for automatically operating said circuit-breaker, a source of fluid pressure on the vehicle and also governing the operation of said automatic circuit-breaker, and controlling means governed by a danger condition on the line of way and governing the operation of said automatic circuit-breaker by said fluid pressure.

15. Means for controlling the movement of an electrically-operated vehicle on a line of way, said means embodying an automatic circuit-breaker, means responsive to a danger condition in the power circuit for automatically operating said circuit-breaker, a fluid-pressure brake system also governing the operation of said automatic circuit-breaker, and automatic power and brake controlling means governed by a danger condition on the line of way.

16. Means for controlling the movement of an electrically-operated vehicle on a line of way, said means embodying an automatic circuit-breaker, means responsive to a danger condition in the power circuit for automatically operating said circuit-breaker, a fluid-pressure brake system including a cylinder and a piston working therein and governing the operation of said automatic circuit-breaker, and automatic power and brake controlling means governed by a danger condition on the line of way.

17. Means for controlling the movement of a power-operated vehicle on a line of way, said means embodying an automatic power-controller, power means normally under restraint and constantly in condition for applying power for governing the operation of said automatic power-controller, and controlling means governed by a danger condition on the line of way for releasing said power means.

18. Means for controlling the movement of a power-operated vehicle on a line of way, said means embodying an automatic power-controller independent of the manual power-controller for the vehicle and governing the power mechanism which operates the vehicle and normally under restraint, and controlling means governed by a danger condition on the line of way for releasing said automatic power-controller.

19. Means for controlling the movement of an electrically-operated vehicle on a line of way, said means embodying an automatic circuit-breaker, power means normally under restraint and constantly in condition for applying power for governing the operation of said automatic circuit-breaker, and controlling means governed by a danger condition on the line of way for releasing said power means.

Signed at Washington in the District of Columbia.

FRANK E. KINSMAN.

Witnesses:
  H. P. BURNEY,
  C. S. CHAMPION.